US012725906B2

(12) United States Patent
Thurne

(10) Patent No.: US 12,725,906 B2
(45) Date of Patent: Sep. 1, 2026

(54) ADJUSTABLE ANTENNA MOUNTING SYSTEM

(71) Applicant: GEM Products, LLC, Jacksonville, FL (US)

(72) Inventor: Jeremy Thurne, Jacksonville, FL (US)

(73) Assignee: GEM Products, LLC, Jacksonville, FL (US)

( * ) Notice: Subject to any disclaimer, the term of this patent is extended or adjusted under 35 U.S.C. 154(b) by 29 days.

(21) Appl. No.: 18/902,189

(22) Filed: Sep. 30, 2024

(65) Prior Publication Data

US 2026/0094960 A1 Apr. 2, 2026

(51) Int. Cl.
*H01Q 1/12* (2006.01)
*H01Q 3/02* (2006.01)

(52) U.S. Cl.
CPC ............... *H01Q 1/125* (2013.01); *H01Q 3/02* (2013.01)

(58) Field of Classification Search
CPC ................................ H01Q 1/125; H01Q 3/02
See application file for complete search history.

(56) References Cited

U.S. PATENT DOCUMENTS

| | | | | |
|---|---|---|---|---|
| 9,083,072 | B2 * | 7/2015 | Conrad | H01Q 1/1242 |
| 10,933,815 | B1 * | 3/2021 | Khubani | B60R 11/0241 |
| 2008/0185260 | A1 * | 8/2008 | Cost | G07F 9/06 194/205 |
| 2016/0268669 | A1 * | 9/2016 | Wilcox | F16M 11/18 |
| 2021/0289889 | A1 * | 9/2021 | Chen | A43C 11/165 |

* cited by examiner

*Primary Examiner* — Hai V Tran
(74) *Attorney, Agent, or Firm* — Taft, Stettinius & Hollister LLP

(57) ABSTRACT

The present invention broadly comprises an antenna mounting system such as for a boat which allows for a user to adjust the angle of the antenna without requiring a threaded fastener to be adjusted. The antenna mounting system uses an adjustment knob which is biased towards an antenna mount and keyed to the antenna mount, where a user may unbiased the adjustment knob relative to the antenna mount and rotate the adjustment knob and antenna mount to adjust the angle of the antenna. This may remove the need to tighten or loosen fasteners to adjust the angle and associated height of the antenna.

20 Claims, 7 Drawing Sheets

ADJUSTABLE ANTENNA MOUNTING SYSTEM

TECHNICAL FIELD OF THE INVENTION

The present invention relates generally to antenna mounts. More particularly, the present invention relates to an adjustable antenna mounting system.

BACKGROUND OF THE INVENTION

Antenna mounts are commonly used to attach antennas to structures, such as houses, recreational vehicles, and boats. The preferred working position of an antenna is substantially perpendicular to the horizon, but this additional height can make it difficult to store or transport. Adjustable antenna mounts allow for the antenna to be stored parallel to the horizon without removing the antenna. Adjustable antenna mounts generally contain at least two portions, an upper portion attached to the antenna, and a lower portion attached to a structure. These two portions are connected together through a rotatable joint and a fastener which needs to be tightened or loosened to allow the user to selectively rotate the joint or secure the joint so that no rotation is possible.

However, the actions required to adjust existing adjustable antenna mounts can be hazardous to the user, because often these mounts are generally hard to reach, the handles generally take excessive force to operate, require two hands to operate, and the application of force to the handle can be difficult for a user because of the required threading and unthreading and lack of ergonomics.

SUMMARY OF THE INVENTION

The present invention broadly comprises an antenna mounting system which allows for a user to adjust the angle of the antenna without requiring a threaded fastener to be adjusted. The antenna mounting system includes a base with a lower section and an upper section. The upper section includes a set of teeth and a through hole. A middle segment includes a lower portion and an upper portion. The lower portion includes a set of teeth and a through hole. The set of teeth of the lower portion and the set of teeth of the upper section of the base may meshingly engage each other and may be held in relative angular orientation via a bolt disposed in the pair of through holes. The upper portion of the middle segment includes a set of teeth and a through hole.

An adjustment knob includes a set of teeth and a through hole. An antenna holder includes a shaft and an antenna mount. The antenna mount may house an antenna. The shaft may be disposed through the through hole of the upper portion of the middle segment and the through hole of the adjustment knob, where the through hole of the adjustment knob may be keyed to the shaft. A washer, a nut, a spacer, and a spring may all be disposed around the shaft of the antenna holder. The nut be threadably engaged with the shaft so as to retain the antenna mount relative to the upper portion of the middle segment. The screw may be threadably engaged with an end hole of the shaft to retain the spring, the spacer and the adjustment knob where the spring may be placed between the spacer and the screw, which may bias the adjustment knob towards the upper portion of the middle segment so the set of teeth of the adjustment knob meshingly engages the set of teeth of the upper portion of the middle segment. A user may compress the spring to overcome the bias force and thus disengage the set of teeth of the adjustment knob from the set of teeth of the upper portion of the middle segment. By disengaging the teeth, the user may be able to rotate the adjustment knob and adjust and/or lower the antenna mounted in the antenna mount without having to thread or unthread a fastener, as is conventionally required.

In an embodiment, the present invention broadly comprises an antenna mounting system that includes a mounting base having a lower section an upper section, and an upper portion. The upper portion includes an upper portion first surface having a plurality of teeth, an upper portion second surface, and an upper portion through hole between the upper portion first surface and the upper portion second surface. An antenna holder includes a base and an antenna mount. The base includes an antenna mount first surface with a shaft extending from the antenna mount first surface, where the shaft is configured to extend through the upper portion through hole. An adjustment knob includes an adjustment knob first surface having a plurality of teeth and an adjustment knob second surface, where an adjustment knob through hole is formed between the adjustment knob first surface and the adjustment knob second surface. The plurality of teeth of the adjustment knob first surface are configured to meshingly engage the plurality of teeth of the upper portion first surface, such that the shaft is disposed through the upper portion through hole and the adjustment knob through hole. A biasing device is mounted around the shaft, where the biasing device is configured to bias the adjustment knob towards the upper portion.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

Figure 1:
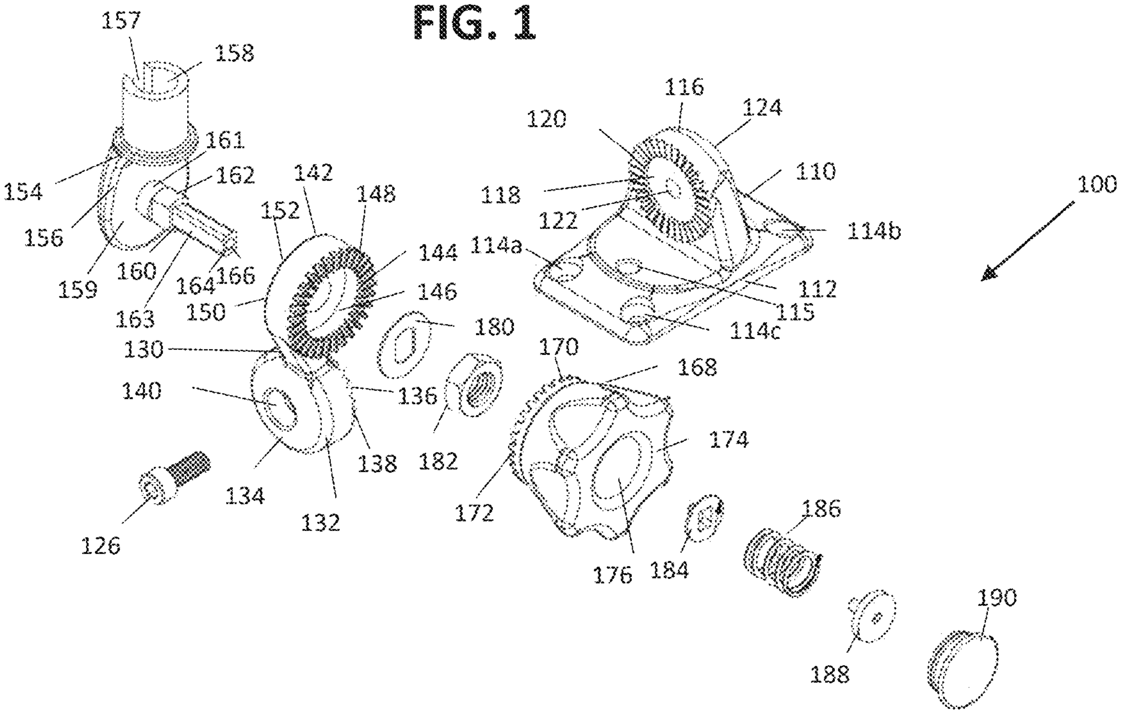
FIG. 1 is a perspective, exploded view of an antenna mounting system, according to an embodiment of the present invention.
Figure 2:
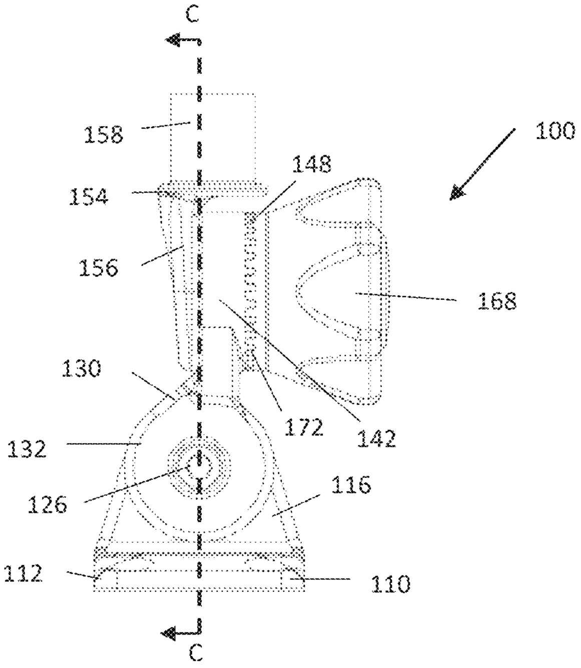
FIG. 2 is a first side view of an antenna mounting system, according to an embodiment of the present invention.
Figure 3:
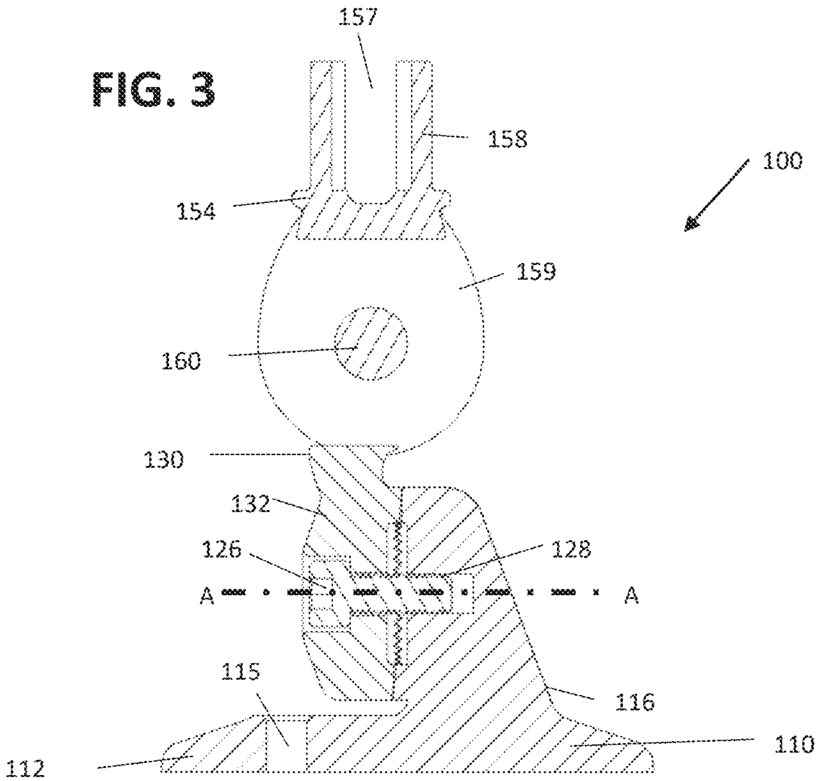
FIG. 3 is a sectional side view along plane C-C in FIG. 2, of the antenna mounting system according to FIG. 2.
Figure 4:
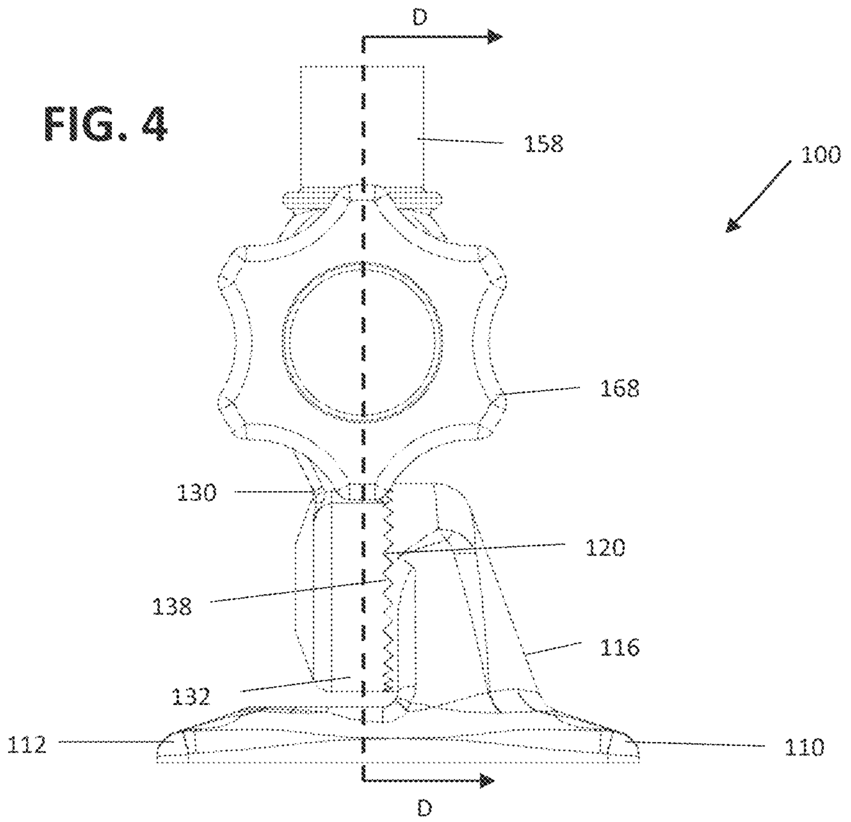
FIG. 4 is a second side view of the antenna mounting system according to FIG. 2.
Figure 5:
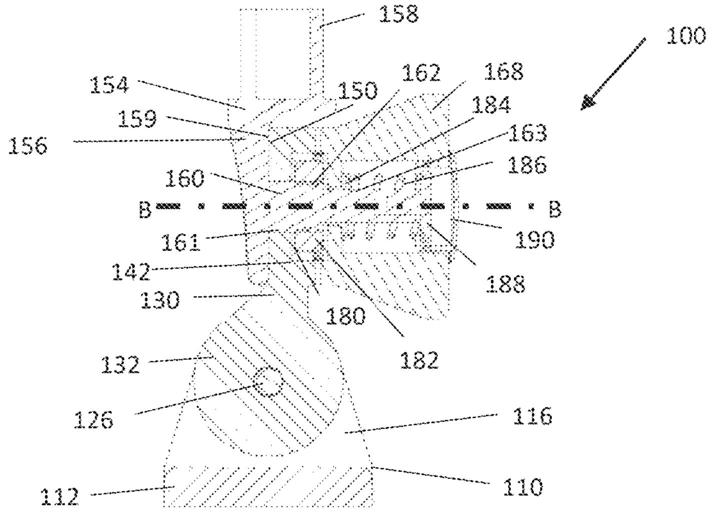
FIG. 5 is a sectional side view along plane D-D in FIG. 5 of the antenna mounting system according to FIG. 2.

While this invention is susceptible of embodiments in many different forms, there is shown in the drawings, and will herein be described in detail, embodiments of the invention, including a preferred embodiment, with the understanding that the present disclosure is to be considered as an exemplification of the principles of the invention and is not intended to limit the broad aspect of the invention to embodiments illustrated. As used herein, the term “present invention" is not intended to limit the scope of the claimed invention and is instead a term used to discuss exemplary embodiments of the invention for explanatory purposes only.

Referring to FIG. 1, in an embodiment, the present invention broadly comprises an antenna mounting system 100 that includes an antenna mounting base 110. The antenna mounting base 110 includes a lower section 112, which may include a plurality of mounting holes 114*a*, 114*b*, and 114*c*. While three mounting holes 114*a*, 114*b*, 114*c* are shown, it should be understood that, in embodiments, any suitable number of mounting holes may be included, such as two mounting holes, four mounting holes, or any other suitable number of mounting holes. The lower section 112 may include a routing hole 115. The routing hole 115 may allow a cable, such as those commonly attached to antennae, to be routed through the base 110.

The antenna mounting base 110 includes an upper section 116 having an upper section first surface 118 including a first set of circumferentially disposed teeth 120. In an embodiment, the first set of teeth 120 may include angled teeth. The upper section 116 includes an upper section second surface 124 opposite the upper section first surface 118. An upper section through hole 122 may extend through the upper section first surface 118 and the upper section second surface 124. A threaded surface 128 may be disposed within the upper section through hole 122.

The antenna mounting system 100 includes a middle segment 130 having a lower portion 132. The lower portion 132 includes a lower portion first surface 134 and a lower portion second surface 136 opposite the lower portion first surface 134. The lower portion second surface 136 includes a second set of circumferentially teeth 138. The second set of teeth 138 are adapted to meshingly engage with the first set of teeth 120. In an embodiment, the second set of teeth 138 may be angled teeth that correspond to the angles of the teeth of the first set of teeth 120. A lower portion through hole 140 may extend through the lower portion first surface 134 and the lower portion second surface 136. In an embodiment, the lower portion through hole 140 is not threaded. A bolt 126 may be disposed through the lower portion through hole 140 and may threadably engage the threaded surface 128 disposed in the upper section through hole 122.

The middle segment 130 includes an upper portion 142 having an upper portion first surface 144 and an upper portion second surface 150 opposite to the upper portion first surface 144. A cavity 146 may be formed in the upper portion first surface 144. A third set of teeth 148 are circumferentially disposed on the upper portion first surface 144 and may circumferentially surround and cooperatively form portions of the walls of the cavity 146. In an embodiment, the third set of teeth 148 may be straight-cut teeth. An upper portion through hole 152 extends through the upper portion first surface 144 and the upper portion second surface 150.

The antenna mounting system 100 includes an antenna holder 154 having a base 156. An antenna mount 158 projects from the base 156. The antenna mount 158 may be shaped and sized to engage a post of any suitable type of antenna which may be used. In embodiments, the antenna mount 158 may be threaded to threadably engage a mating threaded section of the post of the an antenna. The antenna mount 158 may include a slot 157. The slot 157 may allow a cable, such as those commonly attached to antennae, to be routed through the antenna holder 154.

The antenna holder 154 includes an antenna mount first surface 159. A shaft 160 projects from the antenna mount first surface 159 substantially perpendicular to the antenna mount 158. The shaft 160 may have substantially round cross-section portion 161 proximate to the antenna mount first surface 159, a substantially square cross-section portion 163, and may have a portion including a set of external threads 162 and an end hole 164 having a set of internal threads 166 disposed within the end hole 164. The substantially round cross-section portion 161 may act as a bearing surface against the upper portion through hole 152.

The antenna mounting system 100 includes an adjustment knob 168 having an adjustment knob first surface 170 and an adjustment knob second surface 174 opposite the adjustment knob first surface 170. A fourth set of teeth 172 are circumferentially disposed on the adjustment knob first surface 170. In an embodiment, the fourth set of teeth 172 may be straight cut teeth and correspondence to the third set of teeth 148. In an embodiment, a plurality of ergonomic or gripping features may be formed in the adjustment knob second surface 174, which may aid a user to grip the knob 168 when manipulating the adjustment knob 168 and allow the adjustment knob 168 to be manipulated with one hand of a user. An adjustment knob through hole 176 extends through the adjustment knob first surface 170 and the adjustment knob second surface 174. The adjustment knob through hole 176 may be shaped and sized to be keyed to the substantially square cross-section 163, as will be described in more detail herein.

The antenna mounting system 100 may also include a washer 180, a nut 182, a spacer 184, a biasing device 186, a screw 188, and a cover 190, which may be used to cooperatively couple and bias the adjustment knob 168 to the middle segment 130 and the antenna holder 154, as will be described in more detail herein. While the biasing device 186 is shown as a coil spring, it will be appreciated that the biasing device 186 may be any suitable type of biasing device, including but not limited to a leaf spring, a torsion spring, elastomeric or pliable spacer, or any other suitable type of biasing device.

Referring also to FIGS. 2-5, the bolt 126 is disposed through the upper section through hole 122 and the lower portion through hole 140. A threaded surface 128 is rotatably engaged with the bolt 126, such that first set of teeth 120 meshingly engage the second set of teeth 138. When the first set of teeth 120 and the second set of teeth 138 are meshingly engaged, the middle segment 130 is rotatably fixed relative to the base 110 along axis A (shown in FIG. 3). While the base 110 and the middle segment 130 are shown at one particular angle relative to one another, it should be understood that the middle segment 130 may be positioned at any suitable angle relative to the base 110 before coupling the middle segment 130 to the base 110.

While the base 110 and the middle segment 130 are shown as coupled together via the threaded surface 128 and bolt 126, it will be appreciated that the base 110 and middle segment 130 may be coupled together via any suitable coupling mechanisms, including, but not limited to, other types of mechanical fasteners, welding, adhesive, or any other suitable coupling mechanisms. In further embodiments, the base 110 and the lower portion 132 of the middle segment 130 may be unitarily formed as a single piece such that the upper portion 142 is part of the mounting base 110.

The antenna holder 154 is rotatably coupled to the upper portion 142 of the middle segment 130, wherein the shaft 160 is disposed through the upper portion through hole 152. The washer 180, having an aperture that keys to the set of external threads 162, is disposed on the shaft 160. The nut 182 threadably engages the set of external threads 162 of the shaft 160 to thereby couple the upper portion 142 to antenna holder 154 such that the antenna mount first surface 159 abuts the upper portion second surface 150 and the antenna mount first surface 159 acts as a bearing surface against the upper portion second surface 150.

The adjustment knob 168 is coupled to the shaft 160. The adjustment knob through hole 176 may be shaped and sized so as to key to the shaft 160, such that rotation of the adjustment knob 168 around axis B (shown in FIG. 5) results in a corresponding rotation of the antenna holder 154.

The spacer 184 and the biasing device 186 may be disposed in the adjustment knob through hole 176, wherein the spacer 184 creates an abutment surface which may act as a bearing between the shaft 160 and the adjustment knob 168. The spacer 184 may be keyed to the substantially square cross-section 163 so as to rotate along axis B (shown in FIG. 5) to correspond with the adjustment knob 168 and the shaft 160.

The screw 188 may be disposed in the adjustment knob through hole 176 and threadably engage with the set of internal threads 166 disposed within the end hole 164, such that the biasing device 186 may be retained within the adjustment knob through hole 176 and abut the abutment surface of the spacer 184 on one end, and abut the screw 188 on the opposing end. The cover 190 may be disposed proximate to the adjustment knob through hole 176 to prevent dirt or debris from entering the adjustment knob through hole 176 and interfering with the operation of the biasing device 186.

The biasing device 186 is adapted to bias the adjustment knob 168 towards the middle segment 130, such that the fourth set of teeth 172 meshingly engage the third set of teeth 148, and the adjustment knob 168 and the antenna holder 154 cannot rotate along the axis B. If a user pulls the adjustment knob 168 outwardly to overcome the bias force of the biasing device 186, the fourth set of teeth 172 can disengage the third set of teeth 148.

Figure 6:
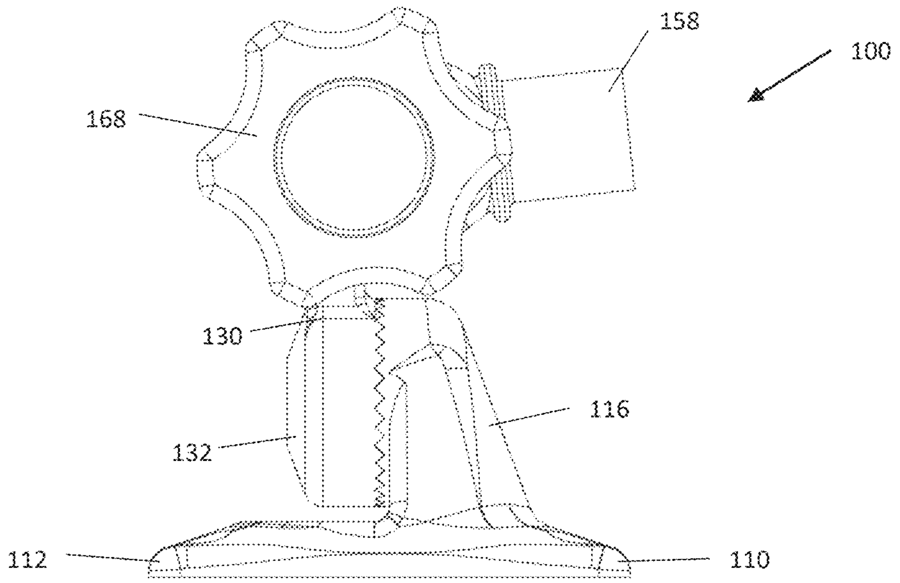
FIG. 6 is a third side view of the antenna mounting system according to FIG. 2.

Referring also to FIG. 6, an embodiment of the antenna mounting system 100 shown and described in FIGS. 1-5 is shown. The adjustment knob 168 and the antenna holder 154 are shown as having been rotated around axis B. A user may compress the biasing device 186 by pulling the adjustment knob 168 away from the antenna holder 154, which may disengage the fourth set of teeth 172 from the third set of teeth 148, and allow the adjustment knob 168 and antenna holder 154 to be rotated along the axis B. This may allow a user to selectively adjust the angle of an antenna mounted in the antenna mount 158 and/or rotate the antenna down to reduce the height of the antenna, such as during storage.

While the antenna mount 158 is shown at a specific angle relative to the base 110, it will be understood that the antenna mounting system 100 may allow the antenna mount 158 to be positioned at any suitable angle relative to the base 110.

Figure 7:
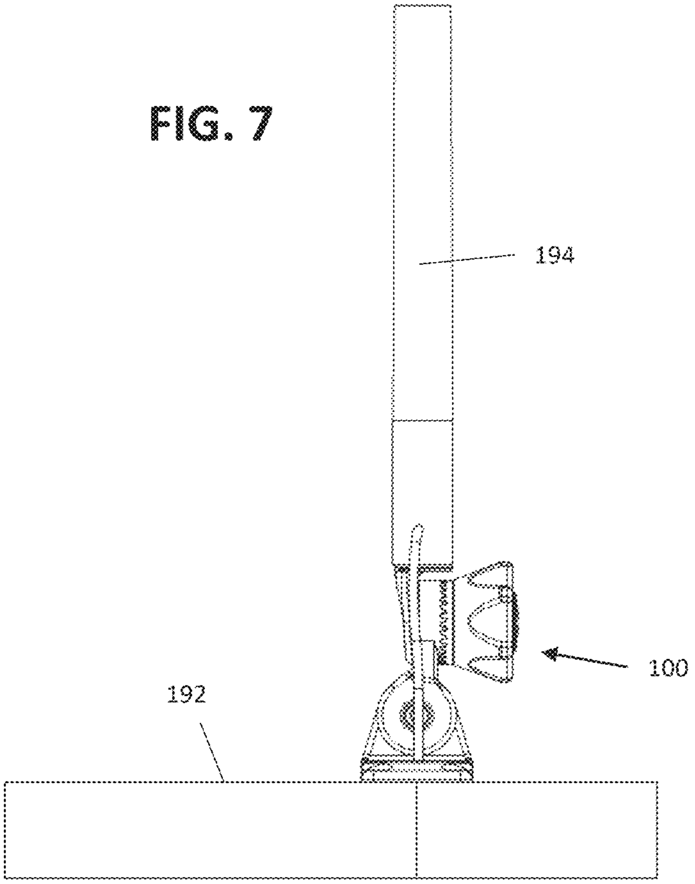
FIG. 7 is a side view of an antenna mounting system mounted to an exemplar surface and supporting an exemplar antenna, according to an embodiment of the present invention.

Referring to FIG. 7, an embodiment of the antenna mounting system 100 mounted to an exemplar mounting surface 192 and supporting an exemplar antenna 194 is shown. The mounting surface 192 may be any suitable surface. The antenna mounting system 100 may be mounted to the mounting surface 192 through any suitable means, such as fasteners respectively disposed in mounting holes 114*a*, 114*b*, 114*c*. The antenna 194 may be any suitable type of antenna, such as a radio antenna, navigation antenna, entertainment antenna, or any other suitable type of antenna.

As used herein, the term "coupled" and its functional equivalents are not intended to necessarily be limited to direct, mechanical coupling of two or more components. Instead, the term "coupled" and its functional equivalents are intended to mean any direct or indirect mechanical or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. An antenna mounting system, comprising:

a mounting base having mounting base lower and upper sections and an upper portion having an upper portion first surface, an upper portion second surface with a third set of teeth, and an upper portion through hole disposed between the upper portion first surface and the upper portion second surface;

an antenna holder having a base and an antenna mount, the base having an antenna holder first surface with a shaft extending from the antenna holder first surface, wherein the shaft is adapted to extend through the upper portion through hole; and an adjustment knob having an adjustment knob first surface with a fourth set of teeth and an adjustment knob second surface, wherein an adjustment knob through hole is disposed between the adjustment knob first and second surfaces and the fourth set of teeth are adapted to meshingly engage the third set of teeth:

wherein the shaft is disposed through the upper portion through hole and the adjustment knob through hole, a biasing device is disposed around the shaft, and the biasing device is adapted to bias the adjustment knob towards the upper portion.

2. The antenna mounting system of claim 1, wherein the biasing device is a spring.

3. The antenna mounting system of claim 2 where the spring is a coil spring.

4. The antenna mounting system of claim 1, wherein the adjustment knob through hole is keyed to the shaft.

5. The antenna mounting system of claim 1, wherein the third set of teeth and the fourth set of teeth are respectively corresponding straight cut teeth.

6. The antenna mounting system of claim 1, wherein the mounting base further includes mounting holes adapted to respectively receive fasteners to couple the mounting base to a surface.

7. The antenna mounting system of claim 1, wherein the shaft further includes an end hole with internal threads, and a screw threadably engages the internal threads.

8. The antenna mounting system of claim 1, further comprising:

a nut, and wherein the shaft further comprises a set of external threads, wherein the nut threadably engages the set of external threads to couple the antenna mount relative to the upper portion.

9. The antenna mounting system of claim 1, further comprising:

the mounting base upper section having an upper section first surface with a first set of teeth and an upper section second surface opposite the upper section first surface; and a middle segment having a middle segment lower portion and the upper portion, the middle segment lower portion having a lower portion first surface with a second set of teeth adapted to meshingly engage the first set of teeth of the upper section first surface, wherein the middle segment lower portion is coupled to the mounting base upper section.

10. The antenna mounting system of claim 9, wherein the first set of teeth and the second set of teeth are respectively corresponding angled cut teeth.

11. The antenna mounting system of claim 9, wherein the mounting base further includes an upper section through hole disposed between the upper section first surface and the upper section second surface and the upper section through hole includes a threaded surface;

the middle segment lower portion further includes a lower portion through hole disposed between the lower portion first and second surfaces;

a bolt disposed through the lower portion through hole and the upper section through hole and engaging the threaded surface of the upper section through hole.

12. An antenna mount adapted to be coupled to a surface, the antenna mount comprising:

a mounting base having mounting base lower and upper sections, mounting holes adapted to respectively receive fasteners to couple the mounting base to the surface, and an upper portion having an upper portion first surface, an upper portion second surface with a third set of teeth, and an upper portion through hole disposed between the upper portion first surface and the upper portion second surface;

an antenna holder having a base and an antenna mount, the base having an antenna holder first surface with a shaft extending from the antenna holder first surface, wherein the shaft is adapted to extend through the upper portion through hole;

an adjustment knob having an adjustment knob first surface with a fourth set of teeth and an adjustment knob second surface, wherein an adjustment knob through hole is disposed between the adjustment knob first and second surfaces and the fourth set of teeth are adapted to meshingly engage the third set of teeth:

wherein the shaft is disposed through the upper portion through hole and the adjustment knob through hole, a biasing device is disposed around the shaft, and the biasing device is adapted to bias the adjustment knob towards the upper portion.

13. The antenna mount of claim 12, wherein the biasing device is a spring.

14. The antenna mount of claim 12, wherein the adjustment knob through hole is keyed to the shaft.

15. The antenna mount of claim 12, wherein the third set of teeth and the fourth set of teeth are respectively corresponding straight cut teeth.

16. The antenna mount of claim 12, wherein the shaft further includes an end hole with internal threads, and a screw threadably engages the internal threads.

17. The antenna mounting system of claim 12, further comprising:

a nut, and wherein the shaft further comprises a set of external threads, wherein the nut threadably engages the set of external threads to couple the antenna mount relative to the upper portion.

18. The antenna mount of claim 12, further comprising:

the mounting base upper section having an upper section first surface with a first set of teeth and an upper section second surface opposite the upper section first surface; and a middle segment having middle segment lower and upper portions, the middle segment lower portion having a lower portion first surface with a second set of teeth adapted to meshingly engage the first set of teeth of the upper section first surface, wherein the middle segment lower portion is coupled to the mounting base upper section.

19. The antenna mount of claim 18, wherein the first set of teeth and the second set of teeth are respectively corresponding angled cut teeth.

20. The antenna mount of claim 18, wherein:

the mounting base further includes an upper section through hole disposed between the upper section first surface and the upper section second surface and the upper section through hole includes a threaded surface;

the middle segment lower portion further includes a lower portion through hole disposed between the lower portion first and second surfaces;

a bolt disposed through the lower portion through hole and the upper section through hole and engaging the threaded surface of the upper section through hole.

* * * * *